United States Patent
Stringa

(10) Patent No.: US 6,665,424 B1
(45) Date of Patent: Dec. 16, 2003

(54) AUTOMATIC INSPECTION OF PRINT QUALITY USING AN ELASTIC MODEL

(75) Inventor: Luigi Stringa, Bd de Belgique (MC)

(73) Assignee: De La Rue Giori S.A., Lausanne (CH)

( * ) Notice: Subject to any disclaimer, the term of this patent is extended or adjusted under 35 U.S.C. 154(b) by 0 days.

(21) Appl. No.: 09/388,224

(22) Filed: Sep. 1, 1999

(30) Foreign Application Priority Data

Sep. 7, 1998 (MC) .................................................. 2411

(51) Int. Cl.$^7$ ................................................. G06K 9/00
(52) U.S. Cl. ...................................... 382/112; 382/294
(58) Field of Search ................................. 382/112, 113, 382/100, 378, 141, 294, 181, 184, 209, 287; 250/559, 571; 399/58, 135, 116, 66; 347/55; 356/237.2; 358/502; 362/556; 428/195

(56) References Cited

U.S. PATENT DOCUMENTS

| | | | |
|---|---|---|---|
| 3,903,794 A | * 9/1975 | Grupe et al. ................. | 101/376 |
| 4,234,640 A | * 11/1980 | Wittel ......................... | 428/159 |
| 4,362,806 A | * 12/1982 | Whitmore .................... | 430/202 |
| 4,859,181 A | * 8/1989 | Neumeyer .................... | 433/69 |
| 4,863,268 A | * 9/1989 | Clarke et al. ............... | 356/237.2 |
| 5,311,246 A | * 5/1994 | Warner et al. ................ | 355/40 |
| 5,384,859 A | * 1/1995 | Bolza-Schunemann et al. .. | 347/19 |
| 5,598,006 A | 1/1997 | Stringa | |
| 5,613,013 A | * 3/1997 | Schuette ..................... | 382/124 |
| 5,778,088 A | 7/1998 | Stringa | |
| 5,848,373 A | * 12/1998 | DeLorme et al. ........... | 701/200 |

* cited by examiner

Primary Examiner—Jayanti K. Patel
(74) Attorney, Agent, or Firm—Bugnion S.A.; John Moetteli

(57) ABSTRACT

The invention relates to a process for producing by electronic means a model for automatically inspecting the print quality on deformable objects. The model is firstly produced by capturing with an electronic camera (CCD for example) the images of a set of sheets whose print quality is regarded as acceptable; the images are stored so as to produce a first reference image, together with the relevant densitometric tolerance limits. This reference image is thereafter divided into a multitude of sub-images by superimposing a grid with very small mesh cells. During inspection, the distances between the nodes of the grid are measured on the image to be inspected: this therefore produces an elastic modification of the model, which is such as to make the distances between the nodes the same as in the image to be inspected. The image to be inspected is thus verified with respect to the modified reference (model) by using any of the standard inspection techniques.

11 Claims, 4 Drawing Sheets

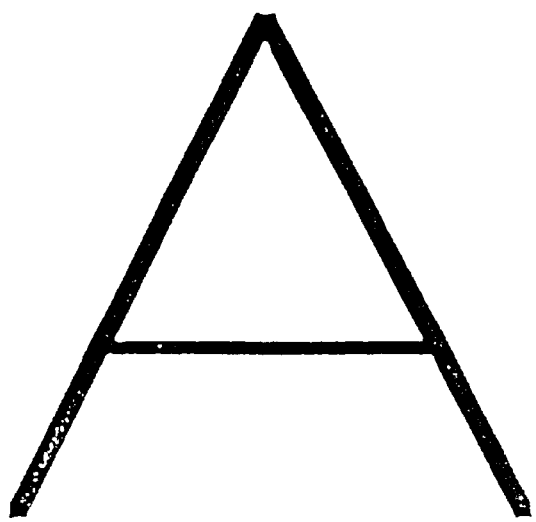
F I G. 2a
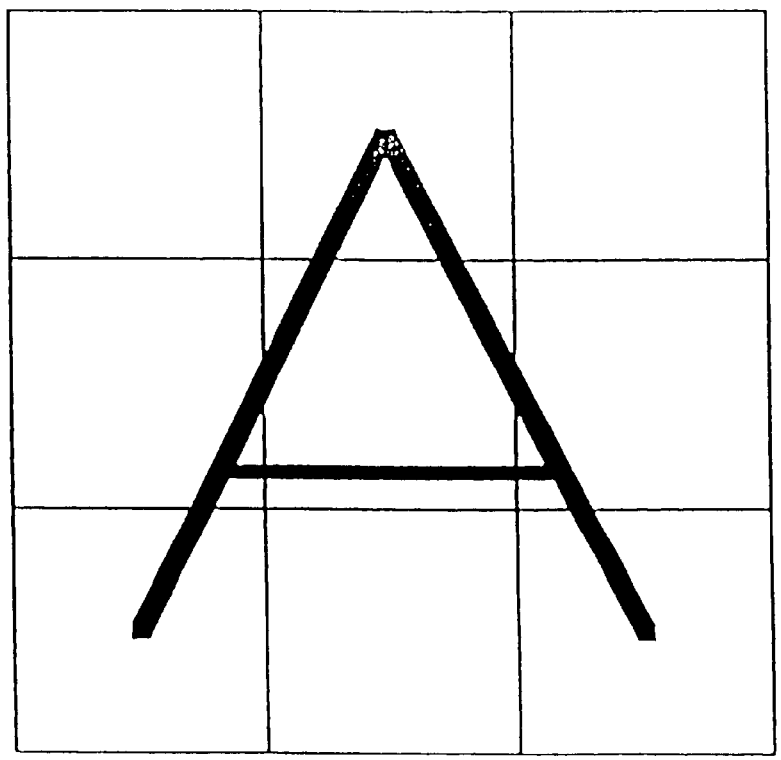
F I G. 2b

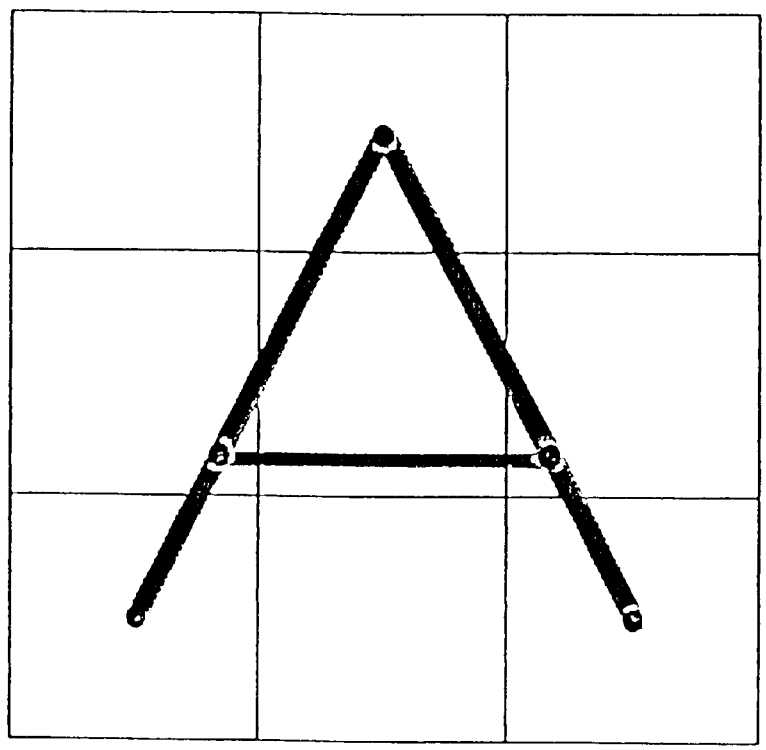
F I G. 3a
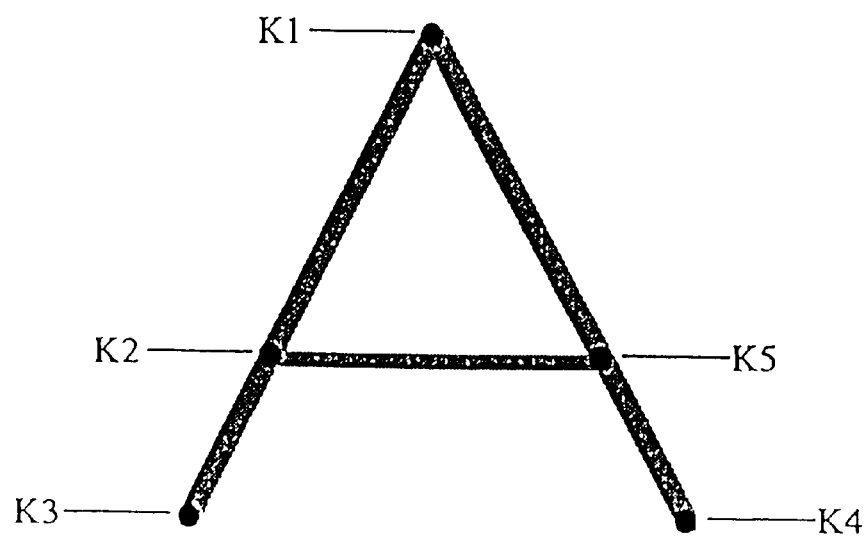
F I G. 3b

AUTOMATIC INSPECTION OF PRINT QUALITY USING AN ELASTIC MODEL

BACKGROUND OF THE INVENTION

The present invention relates to a process for the very careful checking of the print quality on deformable materials, such as sheets of paper, plastic or rubber. More precisely, the invention constitutes a process for modifying, in real time during inspection, the reference models customarily used in automatic checking of print quality so as to correctly inspect, even in cases where the deformation of the sheets produces distortions such that the printed shapes turn out very differently from the model, but nevertheless are still acceptable to the human eye. In fact, all the processes known hitherto use rigid models (undeformable), and hence, in order to compensate for the deformations of sheets (paper, plastic, rubber), are compelled to considerably relax the tolerances so as to reduce the risk of false detections. In particular, this produces a very often unacceptable reduction in the carefulness of inspection.

Several processes for judging the quality of print are generally known: a few examples are given in the list of references. Although several authors have proposed a great variety of setups, almost all the solutions are based on the same fundamental approach, which can be aptly summarized as follows.

A set (Training Set, TS) of one or more samples of objects (sheets, etc.) with a "good" quality of print is used to "train" the inspection system using the reference model, and (or) the relevant printing tolerances in terms of densitometric measurements. In general the process consists in capturing, by means of an electronic scanning system, image(s) of sample (s) of the TS and of the construction of a "reference model" (sometimes referred to as a "golden template") which may be the average of the TS images (or some desirable transformation of them). In addition to the densitometric reference value (that is to say the value in the reference image), for each pixel of the analyzed image, a pair of limit values is calculated (for example, too dark TD and too light TL). Several techniques have been proposed to extract these limits: for example some authors use the minimum (over TS) of the densities of the pixel as TD, and its maximum as TL; others use the gradient of the image; others the standard deviation; etc. In any event, the reference model is a description of the printing tolerances which associates the densitometric limits TD and TL with each pixel of the image. These descriptions are "rigid", that is to say there is no possibility of compensating for deformations, which produce a relative displacement of the printed structure. Therefore, in all the previous solutions, despite the introduction of a few clever processes for relaxing the tolerances of the thresholds (TD and TL), the deformations of the carrier (paper, plastic, etc.) are the main source of the detection of "false defects", that is to say, of prints which do not have defects as far as a human inspector is concerned, and which, notwithstanding this, are rejected by the system. In addition, an increase of this kind in the tolerances causes the inspection to become rather rough and inaccurate, consequently reducing the standard of quality. Therefore, what is needed is a method which enables the automatic and accurate inspection of print quality of deformable objects, without sacrificing the standard of quality.

SUMMARY OF THE INVENTION

The invention is a process which solves the problem identified above by producing, through electronic means, a model for automatically inspecting the print quality on deformable objects. The model is firstly produced by capturing with an electronic camera (CCD for example) the images of a set of sheets whose print quality is regarded as acceptable; the images are stored so as to produce a first reference image, together with the relevant densitometric tolerance limits. This reference image is thereafter divided into a multitude of sub-images by superimposing a grid with very small mesh cells. During inspection, the distances between the nodes of the grid are measured on the image to be inspected: this therefore produces an elastic modification of the model, which is such as to make the distances between the nodes the same as in the image to be inspected. The image to be inspected is thus verified with respect to the modified reference (model) by using any of the standard inspection techniques.

BRIEF DESCRIPTION OF THE DRAWINGS

FIG. 2a shows the character "A" as an example of a printed shape.

FIG. 2b shows the superposition of a 3×3 grid.

FIG. 3a shows five characteristic structures of the shape in Plate FIG. 2a.

FIG. 3b shows the associating of five nodes (from K1 to K5) with these structures.

FIG. 4a shows an example of the deformation of the character "A" of FIG. 3a.

DETAILED DESCRIPTION OF THE PREFERRED EMBODIMENTS(S)

As an example of the present invention, one of the preferred embodiments will be described hereinafter on the basis of the drawings.

According to the present invention, the objects (sheets of paper, plastic, rubber, etc.) to be inspected are analyzed optically by well known optoelectronic means, such as for example a CCD camera (linear or matrix, black and white or color), with the desired resolution so as to produce electronic images of the printed sheets.

Figure 1:
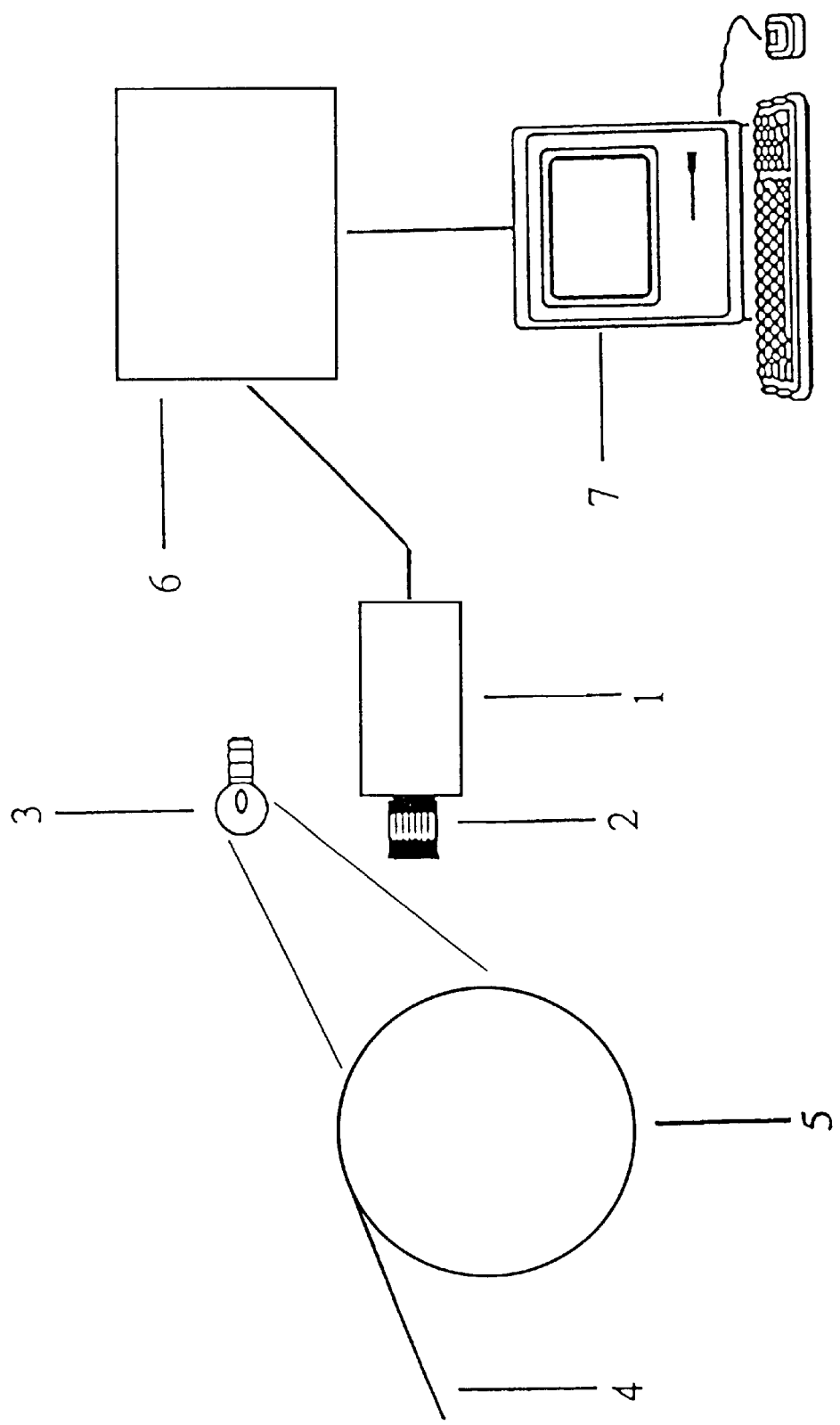
FIG. 1 shows a typical arrangement of the inspection system described in the text.

FIG. 1 shows an arrangement of the inspection system in which a linear CCD camera 1, with its lenses 2 and its illumination system 3, is used to capture the images of the sheets 4 to be inspected while they rotate around the cylinder 5.

An electronic image consists of a discrete set of density values, generally organized as a rectangular matrix. Each element of the matrix (pixel) is a measure of the intensity of the light reflected by the corresponding part of the image. These density values are often digitized into 256 gray levels (for example zero corresponds to black, 255 to white).

In the case of color images, the description generally consists of three matrices corresponding to the red, green and blue components of the light reflected by each pixel of the image.

In what follows, the term "image" is always used instead of "electronic image", both in the case of black and white images (a single matrix of density values), and in the case of color images (three matrices).

As in several solutions in the prior art, the first step of the process is the defining of a training set (TS) consisting of one or more images of the "properly printed" sheets (that is to say, those with no unacceptable defects), which will be used to construct a "model" of good sheets.

In a second step, an image is extracted from TS to be used as a reference (which could be one of the TS images, their average, or any suitable transformation, such as for example the image of the edges of the printed shapes on the sheets). In a third step, the reference image is divided into a large number of sub-images, for example by superimposing a grid (regular or otherwise) as shown in FIG. 2b. In a fourth step, at each mesh cell of the grid, a very characteristic structure of the printed shape (see FIGS. 3a and 3b) is chosen (characteristic either from the topological or geometrical point of view, such as in particular contours, edges, angles, segments, holes, etc.), whose position will be used to measure the deformations of the carrier. Henceforth we shall refer to the positions of the said structures as the nodes of the model. In a fifth step, because the structures may vary from certain very sophisticated topological characteristics, to other rather simpler ones, such as the maximum of the gradient of the image inside the mesh cell, a variety of techniques are applied in order to automatically extract the characteristic structures, and hence the nodes of the model. These are illustrated in further detail below, in the detailed description. In a sixth step, for each node, a deformation threshold is defined as the maximum acceptable displacement of the node from its position in the reference image. In a seventh and last step, from the TS images for each pixel of the model, the densitometric thresholds (for example, too dark TD and too light TL) are constructed according to any of the techniques specially used for this purpose (max-min; standard deviation; variation of the gradient; etc.), but before they are calculated, several other processing steps are carried out on each TS image. In a first processing step, the displacement of each node of the TS image is measured with respect to the corresponding node in the reference image. In a second processing step, an elastic deformation of the TS image is produced such that all its nodes have the same position in the reference image. This step can be undertaken with the desired accuracy by using any of the well-known image deformation algorithms, such as for example the one referred to as "2-pass mesh warping", as described in Catmull, E. et al., *2D Transformations of Images in Scanline Order*, Computer Graphics, CSIGGRAPH 80 Proceedings). Vol. 14, No. 3, pp. 279-285, Jul. 1980, the content of which is incorporated herein by reference.

According to the present invention, therefore, the process for constructing the model is carried out on the TS images suitably deformed so that the nodes have the same position as in the reference image.

During inspection, the images to be evaluated in order to check their print quality are firstly processed in the same way as the images of the TS, and thereafter compared with the limits of the model (thresholds) as in other approaches. Such a process ensures that deformations which are smaller than the deformation thresholds defined elsewhere will be corrected so as to guarantee very careful inspection, while excessively deformed sheets will be rejected as defective.

Clearly, the same result can be obtained by deforming the model (together with its limits, for example the thresholds TD and TL) instead of correcting the images to be inspected.

Referring to FIG. 2a, the character "A" is an example of a printed shape. FIG. 2b shows the superposition of a 3×3 grid. FIG. 3a shows five characteristic structures of the shape in FIG. 2a. Referring now to FIG. 3b, five nodes (from K1 to K5) are associated with these structures.

Figure 4A:
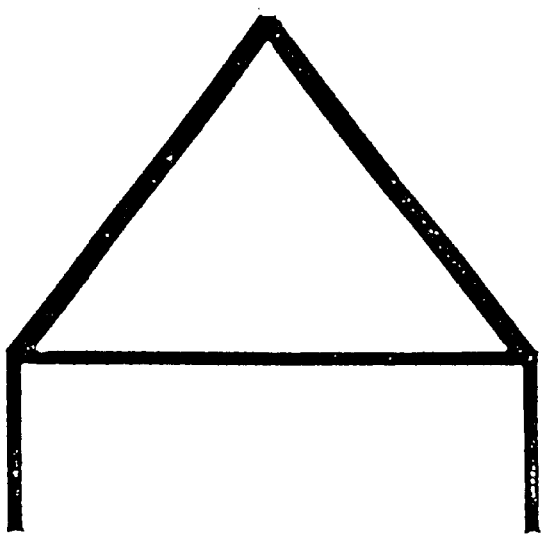
Figure 4B:
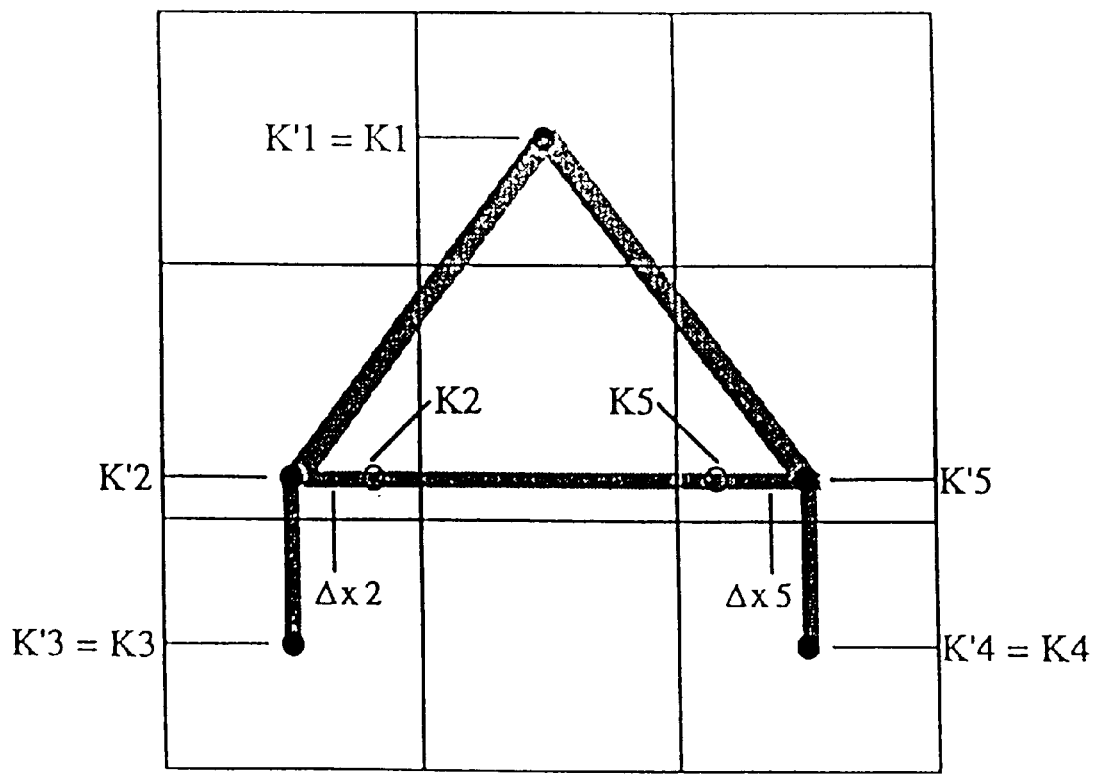
FIG. 4b shows the positions of the nodes in the deformed shape, highlighting the corresponding displacement for each node.

Referring now to FIG. 4a, an example of the deformation of the character "A" of FIG. 3a is shown. FIG. 4b shows the positions of the nodes in the deformed shape, highlighting the corresponding displacement for each node. More precisely, if Ki [i∈(1,5)] is the position of the $i^{th}$ node in the original image, and K'i its position in the deformed image, it is found that in our example all the displacements $\Delta x_i$ and $\Delta y_i$ are zero, except for $\Delta x_2$ and $\Delta x_5$.

Referring again to FIG. 1, the lines scanned by the camera 1 are stored in sequence in a first buffer (memory) circuit of the image processing subsystem 6 to produce an (electronic) image of each sheet.

The image processing subsystem 6, which could be based either on special hardware or on programmable computers, such as DSP (Digital Signal Processors), very fast PCs, etc., carries out different operations during the model construction phase and the inspection phase.

During the model construction phase, the image processing subsystem captures the images of the sheets of the TS and stores them in an appropriate memory. The subsystem then extracts the reference image from the TS (either automatically, or with the aid of the operator, by means of the console of the Operator Interface 7). Next, the subsystem superimposes a grid onto the reference image. The number of rows and columns of the grid can either be predefined or entered by the operator by means of the Operator Interface 7. The subsystem then identifies the position of a node in each mesh cell of the grid, as the coordinates of the pixel or the quantity q given by Equation 1, which follows:

$$q = \left(\sum_A \left|\frac{\partial I(P)}{\partial X}\right|\right) \cdot \left(\sum_A \left|\frac{\partial I(P)}{\partial Y}\right|\right) \qquad [1]$$

at its maximum over the mesh cell

In Equation 1, I(P) is the value of the electronic image at the position of the pixel P and A is a very small square surface (a few pixels) whose center is at P.

By maximizing the product of the sum over A of the absolute values of the partial derivatives we ensure that the node is a structure whose vertical and horizontal position are easily detectable.

Thereafter, each image of the TS is processed by the image processing subsystem 6 according to the following steps. In a first step, the displacement $\Delta x, \Delta y$ of each node of the TS image with respect to the corresponding node in the reference image is identified. In this embodiment, the operation is performed using the method of maximum correlation: a small rectangular portion $S_0$ of the reference image, with its center on the coordinates $x_0, y_0$ of the node, is compared with a portion $S_1$, with the same dimensions, whose center is displaced step by step onto each position (pixel) of the TS image so as to find the position $x_1, y_1$ at which the correlation coefficient has its maximum. The displacement is then given by $\Delta x = x_1 - X_0$ and $\Delta y = y_i - y_0$. In a second step, the TS image is deformed so as to make its nodes have the same position as in the reference image. In this embodiment, the operation is performed by using the already-mentioned algorithm referred to as "2-pass mesh warping". In a third step, the TS of the average Avg(P) and of the standard deviation Sgm(P) of each pixel of the image are calculated over the deformed images.

During the inspection phase, according to the present embodiment of the invention, the image processing subsystem 6 first transposes on each image to be checked, captured by the camera 1, the same deformations used during the model construction phase. The image to be checked will therefore be deformed in such a way that its nodes have the same positions as in the reference image. In a second step, the system calculates the difference Δ(P) between the value I(P) of each pixel P of the image to be checked and the corresponding value of the average Avg(P). In a third step, the system rejects as defective any sheets which are overly deformed (that is to say, sheets for which the displacement of at least one node is larger than the already-defined thresholds). It also rejects sheets for which Δ(P)>KSgm(P) over at least M pixels inside an area with center P and radius R. The parameters K, M and R can be chosen by the operator so as to define the carefulness of inspection (by means of the Operator Interface 7).

Other embodiments are contemplated. In a first alternate embodiment, a matrix camera is substituted for the linear camera. In such a case, the illumination subsystem will have to use flash devices synchronized with the image frequency of the camera, to ensure correct capture of the image. In a second alternate embodiment, the average of the images of the TS is used as a reference image. In a third alternate embodiment, the nodes are manually selected. In a fourth alternate embodiment, a multitude of small masks (templates), (each with its center on a node) are used to search for the displacement of the nodes with a technique such as that referred to as "best superposition" (or best matching). In a fifth alternate embodiment, the approach already mentioned is applied, in which, instead of deforming the image to be inspected in such a way as to position its nodes as in the model (reference image), the model is deformed in such a way that its nodes have the same position as in the image to be inspected. In a sixth alternate embodiment, a different definition for the thresholds from that of proportionality to the standard deviation is used.

Although illustrative embodiments of the invention have been shown and described, a wide range of modification, change and substitution is contemplated in the foregoing disclosure and in some instances, some features of the present invention may be employed without a corresponding use of the other features. Accordingly, it is appropriate that the appended claims be construed broadly and in a manner consistent with the scope of the invention.

What is claimed is:

1. A process for automatically judging the print quality of images printed on a deformable carrier by using an optoelectronic image capture device and an image processing system which measures the deformation of the carrier by superimposing a suitable grid on an image to be inspected, and thereafter by measuring the displacement of positions of characteristic structures of the grid with respect to their position in an image regarded as an undeformed reference image, which, before comparing them with the thresholds, deforms the images to be inspected so that their respective characteristic structures have the same position as those of the reference image.

2. The process as claimed in claim 1, in which the reference image is one of the images of a Training Set.

3. The process as claimed in claim 1, in which the undeformed reference image is an average of the images of a Training Set.

4. The process as claimed in claim 1, in which the characteristic structures are positioned manually by an operator on characteristic structures of the printed shape.

5. The process as claimed in claim 1, in which the characteristic structures are identified automatically by extraction from inside each mesh cell by means of any technique for extracting well-known characteristic structures.

6. The process as claimed in claim 1, in which the deformation of the images is obtained by means of a 2-pass mesh warping algorithm.

7. The process as claimed in claim 1, in which the deformation of the images is calculated by approximation according to techniques selected from a group of techniques consisting of elastic deformations, bilinear interpolation, interpolation of any degree, and rigid translation of a mesh cell.

8. The process as claimed in claim 1, in which the characteristic structures are searched for over regions of the sheet in a manner different from the superposition of the grid, including random searching.

9. A process for automatically judging the print quality of images printed on a deformable carrier by using an optoelectronic image capture device and an image processing system which measures the deformation of the carrier by superimposing a suitable grid on an image to be inspected, and thereafter by measuring the displacement of positions of characteristic structures of the grid with respect to their position in an image regarded as an undeformed reference image, which, before comparing them with the thresholds, deforms the images to be inspected so that their respective characteristic structures have the same position as those of the reference image, in which the characteristic structures are positioned automatically at a maximum over each mesh cell of the quantity defined by the following equation:

$$q = \left(\sum_A \left|\frac{\partial I(P)}{\partial X}\right|\right) \cdot \left(\sum_A \left|\frac{\partial I(P)}{\partial Y}\right|\right).$$

10. A process for automatically judging the print quality of images printed on a deformable carrier by using an optoelectronic image capture device and an image processing system which measures the deformation of the carrier by superimposing a suitable grid on an image to be inspected, and thereafter by measuring the displacement of positions of characteristic structures of the grid with respect to their position in an image regarded as an undeformed reference image, which, before comparing the characteristic structures with the thresholds, deforms the model so as to obtain the same positions of the characteristic structures as in the image to be inspected.

11. A process for automatically judging the print quality of images printed on a deformable carrier by using an optoelectronic image capture device and an image processing system which measures the deformation of the carrier by superimposing a suitable grid on an image to be inspected, and thereafter by measuring the displacement of positions of characteristic structures of the grid with respect to their position in an image regarded as an undeformed reference image, which, before comparing the characteristic structures with the thresholds, deforms the reference image so as to obtain the same positions of the characteristic structures as in the image to be inspected.

* * * * *